US010872349B1

(12) United States Patent
Hijirida et al.

(10) Patent No.: US 10,872,349 B1
(45) Date of Patent: Dec. 22, 2020

(54) REDEEMING REWARDS POINTS

(75) Inventors: David H. Hijirida, Seattle, WA (US);
Mark Allan Schaler, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 325 days.

(21) Appl. No.: 12/242,523

(22) Filed: Sep. 30, 2008

(51) Int. Cl.
*G06Q 30/02* (2012.01)

(52) U.S. Cl.
CPC ..... *G06Q 30/0227* (2013.01); *G06Q 30/0233* (2013.01)

(58) Field of Classification Search
CPC .................. G06Q 30/0227; G06Q 30/0233
USPC .... 705/1.1, 14.1, 14.11, 14.12, 14.14, 14.17, 705/14.18, 14.23, 14.25, 14.27, 14.28, 705/14.29, 14.3, 14.31, 14.33, 14.34, 705/14.36, 14.38, 14.5, 14.56, 37
See application file for complete search history.

(56) References Cited

U.S. PATENT DOCUMENTS

| | | | |
|---|---|---|---|
| 5,774,870 A | 6/1998 | Storey | |
| 5,937,391 A | 8/1999 | Ikeda et al. | |
| 6,009,412 A | 12/1999 | Storey | |
| 6,032,136 A | 2/2000 | Brake, Jr. et al. | |
| 6,175,823 B1 | 1/2001 | Van Dusen | |
| 6,578,012 B1 | 6/2003 | Storey | |
| 6,594,640 B1 | 7/2003 | Postrel | |
| 6,594,644 B1 | 7/2003 | Van Dusen | |
| 6,601,761 B1 | 8/2003 | Katis | |
| 6,820,061 B2 | 11/2004 | Postrel | |
| 7,069,240 B2 * | 6/2006 | Spero | G06Q 20/20 705/26.35 |
| 2001/0054003 A1 * | 12/2001 | Chien | G06Q 20/04 705/14.17 |
| 2002/0062249 A1 | 5/2002 | Iannacci | |
| 2002/0065723 A1 * | 5/2002 | Anderson | G06Q 30/02 705/14.25 |
| 2002/0082920 A1 | 6/2002 | Austin et al. | |
| 2002/0143614 A1 | 10/2002 | MacLean et al. | |
| 2002/0161630 A1 | 10/2002 | Kern et al. | |
| 2003/0200144 A1 | 10/2003 | Antonucci et al. | |
| 2005/0144074 A1 | 6/2005 | Fredregill et al. | |
| 2005/0251440 A1 | 11/2005 | Bednarek | |
| 2006/0010033 A1 * | 1/2006 | Thomas | 705/14 |

(Continued)

FOREIGN PATENT DOCUMENTS

WO    WO 2005/029259 A2 *    9/2004

OTHER PUBLICATIONS

Alamo Receipt and Order confirmation with barcode on it. Hereinafter Alamo.*

(Continued)

*Primary Examiner* — Colleen A Hoar
(74) *Attorney, Agent, or Firm* — Lee & Hayes, P.C.

(57) ABSTRACT

Techniques for redeeming accumulated rewards points at a service provider that is independent from a provider of the accumulated rewards points are described herein. The service provide may authenticate a user having an account at the service provider and then associate the user account with a user account at one or more points providers. The service provider may then determine a number of accumulated and available rewards points for the user account(s) at the points provider(s). The service provider may then allow the user to redeem one or more of the rewards points when conducting a transaction with the independent service provider.

24 Claims, 8 Drawing Sheets

(56) References Cited

U.S. PATENT DOCUMENTS

| | | | |
|---|---|---|---|
| 2006/0031120 | A1 | 2/2006 | Roehr et al. |
| 2006/0053056 | A1 | 3/2006 | Alspach-Goss et al. |
| 2006/0208065 | A1 | 9/2006 | Mendelovich et al. |
| 2006/0248007 | A1 | 11/2006 | Hofer et al. |
| 2007/0149252 | A1 | 6/2007 | Jobs et al. |
| 2008/0052153 | A1 | 2/2008 | Cook |
| 2008/0059317 | A1 | 3/2008 | Chandran et al. |
| 2008/0281692 | A1 | 11/2008 | Zhang et al. |
| 2009/0006203 | A1 | 1/2009 | Fordyce, III et al. |
| 2010/0010918 | A1* | 1/2010 | Hunt ............... 705/27 |

OTHER PUBLICATIONS

Home Depot with images of purchase on receipt. Hereinafter Home Depot.*

Non-Final Office Action for U.S. Appl. No. 13/112,721, dated May 11, 2012, Mark Allan Schaler et al., "Earning and Redeeming Rewards Points", 22 pages.

Creditcards.com, Wayback Machine, Jun. 23, 2007, pp. #1-pp. #5.

Cowlishaw, "Decimal Floating-Point: Algorism for Computers", Proceedings of the 16th IEEE Symposium on Computer Arithmetic, 2003, 8 pages.

IEEE, "IEEE Standard for Radix-Independent Floating-Point Arithmetic", the Institute of Electrical and Electronic Engineers, Inc., 1987, 19 pages.

Office action for U.S. Appl. No. 13/112,721, dated Jan. 17, 2013, Schaler et al., "Earning and Redeeming Rewards Points", 45 pages.

Office action for U.S. Appl. No. 13/112,721, dated Jul. 3, 2014, Schaler et al., "Earning and Redeeming Rewards Points", 48 pages.

Final Office Action for U.S. Appl. No. 13/112,721, dated Mar. 18, 2015, Markm Allan Schaler, "Earning and Redeeming Rewards Points", 59 pages.

Office action for U.S. Appl. No. 13/112,721, dated Apr. 21, 2016, Schaler et al., "Earning and Redeeming Rewards Points", 65 pages.

Office Action for U.S. Appl. No. 13/112,721, dated Oct. 20, 2016, Schaler et al., "Earning and Redeeming Rewards Points", 64 pages.

* cited by examiner

400

Payment Methods http://www.site.com/paymentmethods

402 — Please Select a Payment Method

Pay with Your Accumulated Points!    (Learn More)

404 —
● Provider 122 Points (100,000 Points Available for Use)
   Amount to Apply to Purchase: 10,000
○ Provider ABC Points (5,550 Points Available for Use)
   Amount to Apply to Purchase: 0

406 —

Pay With a Credit Card

408 —
● Your Provider 122 Visa
○ Your Provider ABC Visa
○ Other ▽    Card Number        Name Billing Address    Exp. Date
                   Jan. ▽   2010 ▽

Pay With a Bank Account

Fig. 4

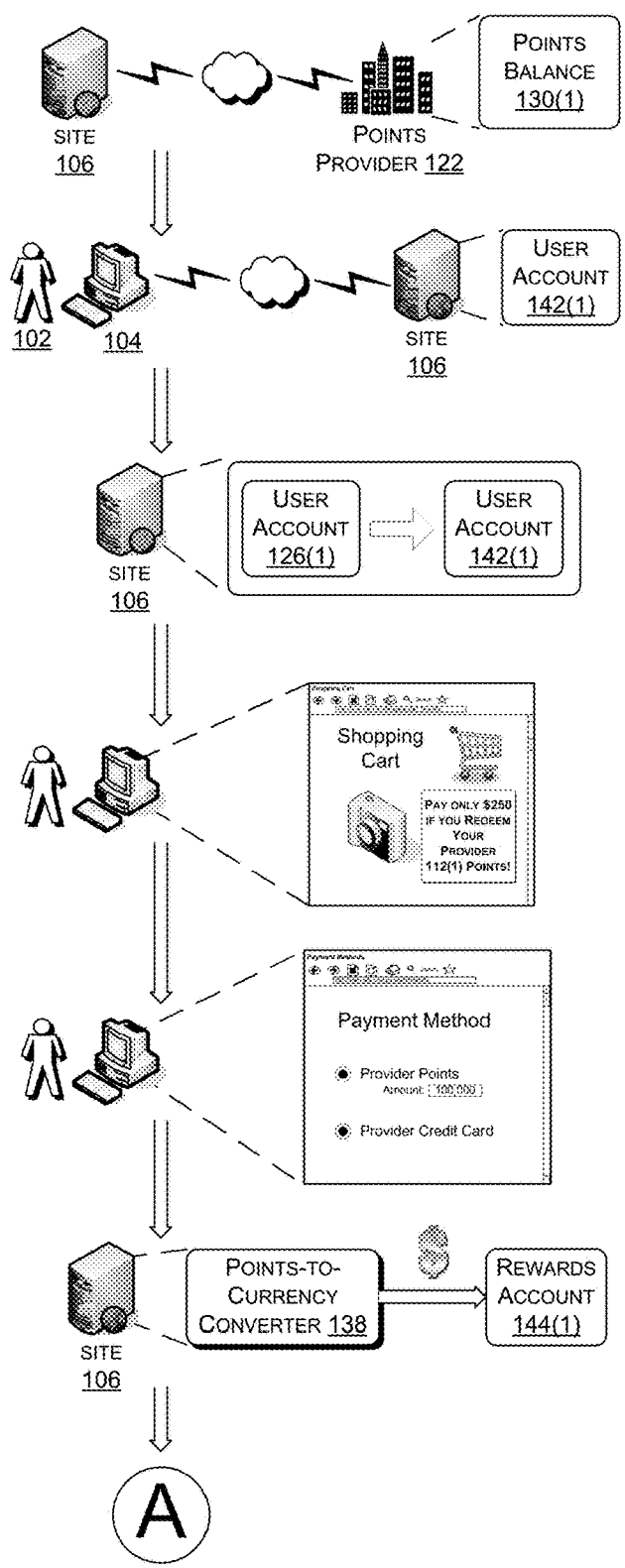

602 Site Periodically Queries Provider(s) for Updated Point Balance(s)

604 User Logs into a Corresponding User Account of the Site

606 Site Associates User Account at Site with User Account at Provider for User

608 Site Provides a Message Regarding Redeeming Points to User

610 User Chooses to Redeem Points by Purchasing an Item

612 Site Converts Points to Currency and Places Currency into Rewards Account

Fig. 6

REDEEMING REWARDS POINTS

BACKGROUND

Credit card companies often compete for consumers by offering varying types of rewards programs. For instance, these credit card companies may allow a consumer to receive points in proportion to a number of dollars spent with a corresponding credit card. The consumer may then redeem these points through the credit card company. For example, the credit card company may exchange the consumer's points for travel or merchandise.

Unfortunately, the travel and merchandise made available for exchange by the credit card companies are typically quite limited. Furthermore, because the credit card companies typically determine the point-cost of these items, the consumers often obtain limited value for their acquired rewards points.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 4 illustrates an example payment user interface served by the service provider site of FIG. 1. Here, the user chooses to purchase the item illustrated in FIG. 3 with rewards points and an associated credit card.

FIGS. 6-7 illustrate a flow diagram of a user redeeming rewards points at a service provider that is independent from a points provider at which the user accumulated the rewards points.

DETAILED DESCRIPTION

This disclosure is directed to, among others, redeeming accumulated rewards points at a service provider that is independent from a provider of the accumulated rewards points. A service provider may authenticate a user having a user account at the service provider. The service provider may then associate the user account at the service provider with a corresponding user account at one or more points providers. The service provider may then determine a number of accumulated and available rewards points for the user account(s) at the points provider(s). The service provider may then allow the user to redeem one or more of the rewards points when conducting a transaction with the independent service provider.

In some instances, a points provider comprises a financial institution that issues a credit card or other line of credit to the user. The service provider, meanwhile, may comprise a merchant or other entity that is independent from the financial institution and with which the user may conduct a transaction. By allowing users to redeem rewards points at an entity that is independent from the financial company, the described techniques may result in a better selection of redeemable items than when compared with traditional redemption techniques in some instances. In fact, in some instances, the described techniques allow a user to authenticate at a service provider (by, for example, logging onto the user account at the service provider) and redeem points at the service provider without authenticating at the points provider. As such, the techniques may allow users to redeem points in the course of regular business with a service provider—as opposed to requiring that the users work through the points provider in order to redeem points at the service provider.

Furthermore, because the service provider may be in the business of conducting these types of transactions (e.g., item purchases, travel purchases, etc.), the value assigned to the rewards points may be more favorable to the user than when compared with traditional techniques in some instances.

The described techniques for redeeming rewards points may be implemented in a number of ways and in a number of contexts. One example implementation and context is provided with reference to the following figures, as described below in more detail. It is to be appreciated, however, that the following implementation and context is but one of many.

Illustrative Environment and System Architecture

Figure 1:
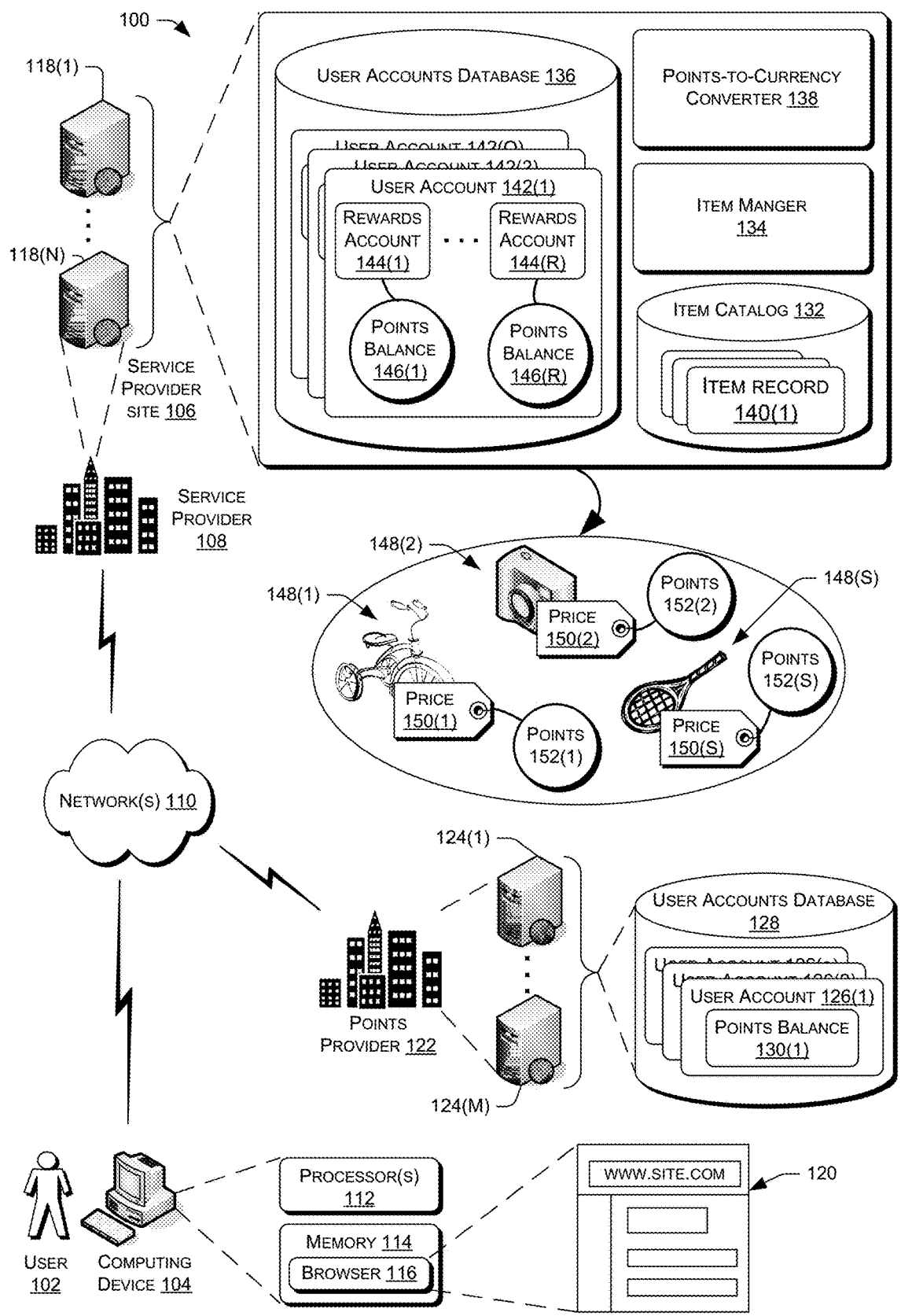
FIG. 1 illustrates an example architecture for redeeming accumulated rewards points at a service provider that is independent from a points provider, such as a financial institution, that provides the accumulated rewards points. Here, a user may accumulate points from the points provider and redeem these points through the service provider that offers a broad catalog of items and a favorable point/item exchange rate.

FIG. 1 illustrates an example architecture 100 in which the described techniques for redeeming rewards points at an independent service provider may be implemented. Here, the techniques are described in the context of a site hosted by the service provider. It is to be appreciated, however, that the described techniques may be implemented in a vast number of other environments. For instance, the described transactions may also be consummated, in whole or in part, in person (e.g., at a brick-and-mortar store), over the phone, or in any other manner.

In architecture 100, a representative user 102 employs a user computing device 104 to access a representative service provider site 106 associated with a service provider 108. Service provider 108 may be, for instance, a merchant, business, or other entity with which user 102 may conduct transactions. Service provider site 106, meanwhile, may comprise any sort of site that supports user interaction, including e-commerce sites, social networking sites, informational sites, news and entertainment sites, and so forth. As described in detail below, the current example illustrates, for discussion purposes only, that site 106 comprises an e-commerce site. Additionally, the site is representative of proprietary sites that receive requests and provide content over proprietary networks other than the Internet and public web.

While the illustrated example represents user 102 accessing site 106 of service provider 108, the described techniques may equally apply in instances where user 102 interacts with service provider 108 over the phone, via a kiosk, or in any other manner. It is also noted that the described techniques may apply in other client/server arrangements, as well as in non-client/server arrangements (e.g., locally-stored software applications, set-top boxes, etc.).

Here, user 102 accesses site 106 of service provider 108 via a network 110. Network 110 may include any one or combination of multiple different types of networks, such as cable networks, the Internet, and wireless networks. User computing device 104, meanwhile, may be implemented as any number of computing devices, including as a personal computer, a laptop computer, a portable digital assistant (PDA), a cell phone, a set-top box, a game console, a personal media player (PMP), and so forth. User computing device 104 is equipped with one or more processors 112 and memory 114 to store applications and data. An application, such as browser 116 or other client application, running on device 104 facilitates access to site 106 over network 110.

Site 106 is hosted on one or more servers 118(1), ..., 118(N) having processing and storage capabilities. In one implementation, the servers might be arranged in a cluster or as a server farm, although other server architectures may also be used to host the site. The site is capable of handling requests from many users and serving, in response, various pages of content that can be rendered at user computing device 104 for viewing by user 102. For instance and as illustrated, site 106 may serve a page 120 to computing device 104. Page 120 may comprise any sort of content, such as a user profile, a search page, a discussion forum, a page illustrating details about an item for consumption or any other type of page. Furthermore, while the proceeding discussion describes the techniques with reference to pages, it is to be appreciated that the described techniques are equally applicable to other types of user interfaces (UIs). That is, the described techniques may apply to any sort of interface that includes visual content.

Architecture 100 also includes a points provider 122. While FIG. 1 illustrates a single points provider 122, it is to be appreciated that other embodiments may employ multiple providers. Points provider 122 is an entity that issues rewards points to users, such as user 102, in response to user 102 providing value to points provider 122. For instance, points provider 122 may comprise a financial institution or other type of business that issues rewards points in response to user 102 conducting business at or with the financial institution or other business. Points provider 122 may additionally or alternatively issue rewards points for user participation in any other prescribed activity (e.g., signing up for a credit card, flying a particular airline, consistently showing up to a place of employment on time, renting a hotel room at a specified hotel, etc.). Furthermore, it is noted that rewards points issued by points provider 122 may carry any denomination, such as points, units, miles, or the like. Points provider 122 may comprise, for instance, a hotel chain that issues rewards points to guests for renting hotel rooms, an employer that issues rewards points to employees for specified behavior, and/or the like.

In one embodiment, points provider 122 comprises a bank that issues a credit card or line of credit to users, such as user 102. These users may then accumulate rewards points in response to using the issued credit card. The amount of these accumulated rewards points may be in proportion to the amount of use (e.g., one point for every dollar spent with the credit card). In another embodiment, points provider 122 may comprise a business that issues rewards points in response to user 102 consuming (e.g., purchasing, renting, leasing, etc.) items at points provider 122.

As illustrated, points provider 122 may be hosted on one or more servers 124(1), ..., 124(M) having processing and storage capabilities. Servers 124(1)-(M) store information about one or more user accounts 126(1), ..., 126(O) in a user accounts database 128. Each of user accounts 126(1)-(O) may be associated with a corresponding user or other entity (e.g., family, business, etc.). Furthermore, each of user accounts 126(1)-(O) may measure the volume or frequency with which each corresponding user conducts transactions with points provider 122. For instance, user account 126(1) may be associated with a credit card or line of credit issued by points provider 122 to user 102. User account 126(1) may, accordingly, measure an amount of credit used by the user associated with user account 126(1).

In response to conducting transactions with a user account (e.g., purchasing items with a corresponding credit card, consuming items at points provider 122), points provider 122 may issue one or more rewards points. As such and as illustrated, each of user accounts 126(1)-(O) may include a points balance 130(1), ..., 130(O) indicative of a number of rewards points available for redemption. Because points provider 122 issues rewards points in response to use of a corresponding user account, points provider 122 is also the system of record for rewards points balances 130(1)-(O). That is, points provider 122 may provide the authoritative rewards points balances for user accounts 126(1)-(O).

In the current example, user 102 is associated with user account 126(1) having a rewards points balance 130(1). With the described techniques, user 102 may redeem one or more rewards points of balance 130(1) at one or more service providers that are independent of points provider 122. For example, user 102 may redeem these rewards points at service provider 108 via site 106. In some instances, user 102 may redeem these rewards points at service provider 108 via site 106 without authenticating directly and/or interacting with a corresponding user account at points provider 122.

As discussed above, service provider site 106 may comprise an e-commerce site in some instances. Therefore, the described techniques may allow user 102 to accumulate rewards points at points provider 122 and redeem any portion of these accumulated points by consuming (e.g., purchasing) items at site 106.

In the current example, servers 118(1)-(N) may store or otherwise have access to an item catalog 132, an item manager 134, a user account database 136, and a points-to-currency converter 138. While FIG. 1 illustrates site 106 and servers 118(1)-(N) as a single entity, it is to be appreciated that the described functionality may be spread amongst multiple entities and/or across multiple networks.

Item catalog 132 stores a collection of item records 140(1), ..., 140(P). Item catalog 132 is accessible, directly or indirectly, by one or more of servers 118(1)-(N). Each item record 140(1)-(P), meanwhile, represents an associated item being offered for consumption on site 106 and contains information about the associated item. For products such as books or music CDs, for example, the item record may contain a description, images of the product, author/artist names, publication data, pricing, shipping information, and so forth. For other types of items, the item record may contain different information appropriate for those items.

An item, meanwhile, includes anything that site 106 offers for purchase, rental, subscription, viewing, informative purposes, or some other form of consumption. In some embodiments the item may be offered for consumption by service provider 108. However, in some embodiments service provider site 106 may host items that others are offering using the site. An item can include a product, a service, a digital download, a news clip, customer-created content, information, or some other type of sellable or non-sellable unit. Hereafter, the term "item" may be used interchangeably with the term "item record".

Item manager 134 may facilitate access to and management of item records 140(1)-(P) in item catalog 132. Item manager 134 allows operators of site 106 to add or remove items to or from item catalog 132, and generally maintain control of the items on site 106. When a user requests information on an item from site 106, one or more of servers 118(1)-(N) retrieve the item information from item catalog 132 and serve a page containing the information to the requesting user computing device. Item catalog 132 may therefore contain static pages that are pre-generated and stored prior to such requests, or may alternatively store data that is used to populate dynamic pages that are generated in response to such requests.

User accounts database 136, meanwhile, stores information pertaining to one or more users accounts 142(1), . . . , 142(Q), each of which is associated with one or more users, such as user 102. For instance, each user account 142(1)-(Q) may store authentication information of each user registered with site 106. For instance, site 106 may store (or otherwise have access to) an identity and password of each user. Therefore, when user 102 accesses site 106 with computing device 104, user 102 may authenticate with site 106. In response, site 106 may associate user 102 with a corresponding user account, such as user account 142(1).

Furthermore, service provider site 106 may associate one or more of user accounts 142(1)-(Q) with corresponding user accounts at one or more points providers. For instance, site 106 may associate user account 142(1) with user account 126(1) (also associated with user 102) at points provider 122. Additionally, site 106 may associate user account 142(1) with one or more other users accounts (associated with user 102) with the same or other points providers.

Furthermore, site 106 may periodically query points provider 122 (i.e., the system of record) for a rewards points balance associated with the user account 126(1) at points provider 122. With this information, site 106 may allow user 102 to redeem some or all rewards points accumulated at points provider 122 at service provider site 106.

Thus, FIG. 1 illustrates that user account 142(1) includes one or more rewards accounts 144(1), . . . , (R). Each of rewards accounts 144(1)-(R) are associated with a user account of user 102 at points provider 122 or another points provider. Furthermore, for each of rewards accounts 144(1)-(R), user account 142(1) stores or has access to a rewards points balance 146(1), . . . , 146(R). Again, rewards points balances 146(1)-(R) represent a number of rewards points accumulated by user 102 through use of a corresponding user account at a points provider. Therefore, user 102 may use rewards points from rewards accounts 144(1)-(R) when consuming (e.g., purchasing, renting, viewing, etc.) an item offered by site 106.

For instance, envision that user 102 carries a credit card or line of credit offered by points provider 122, in this case a financial institution such as a bank. Envision further that user 102 has earned a certain number of rewards points through use of this credit card or line of credit. Site 106 periodically (e.g., hourly, nightly, weekly, etc.) receives an updated rewards points balance for this user account (here, associated with a credit card or line of credit). With this updated balance, site 106 allows user 102 to purchase or otherwise consume items offered by site 106. User 102 may therefore use his or her accumulated points to consume items from a service provider that is independent from the bank that issued the card. Further, because the service provider may be in the business of offering items for consumption (whereas the bank is not), user 102 may choose from a better selection of items and may receive a more favorable points-to-value conversion.

To allow user 102 to consume items with these rewards points, site 106 may apply the raw points to a cost of an item or the site may first convert the points to a currency value. Here, site 106 includes converter 138, which converts rewards points into a currency value, such as U.S. dollars, Euros, Pesos, or the like. Site 106 may then store this currency value in a corresponding rewards account (e.g., rewards account 144(1)) for use by user 102. Therefore, this currency value may be deducted from the cost of an item that user 102 requests to purchase.

To illustrate, FIG. 1 includes three items 148(1), (2), . . . , (S). Each of items 148(1)-(S) has a corresponding prices 150(1), (2), . . . , (S) at which site 106 offers the item for consumption. Furthermore, each of prices 150(1)-(S) converts to a fixed or variable number of rewards points 152(1), (2), . . . , (S).

For instance, envision that tricycle 148(1) has a price 150(1) of $100, and that each reward point for a particular user account is worth one U.S. cent. Therefore, price 150(1) would correspond to 10,000 points. Envision further that user 102 has 5,000 points for use via that particular user account. Here, converter 138 would convert the 5,000 points into fifty U.S. dollars in response to user 102 requesting to purchase tricycle 148(1). User 102 would, therefore, need to provide site with an additional fifty U.S. dollars (without regards to other costs such as tax and shipping) in order to purchase the tricycle. As discussed in detail below, user 102 may pay this remaining balance through the user account associated with the rewards points (e.g., the credit card with which the user earned the points) or with another payment instrument.

Illustrative User Interfaces

Figure 2:
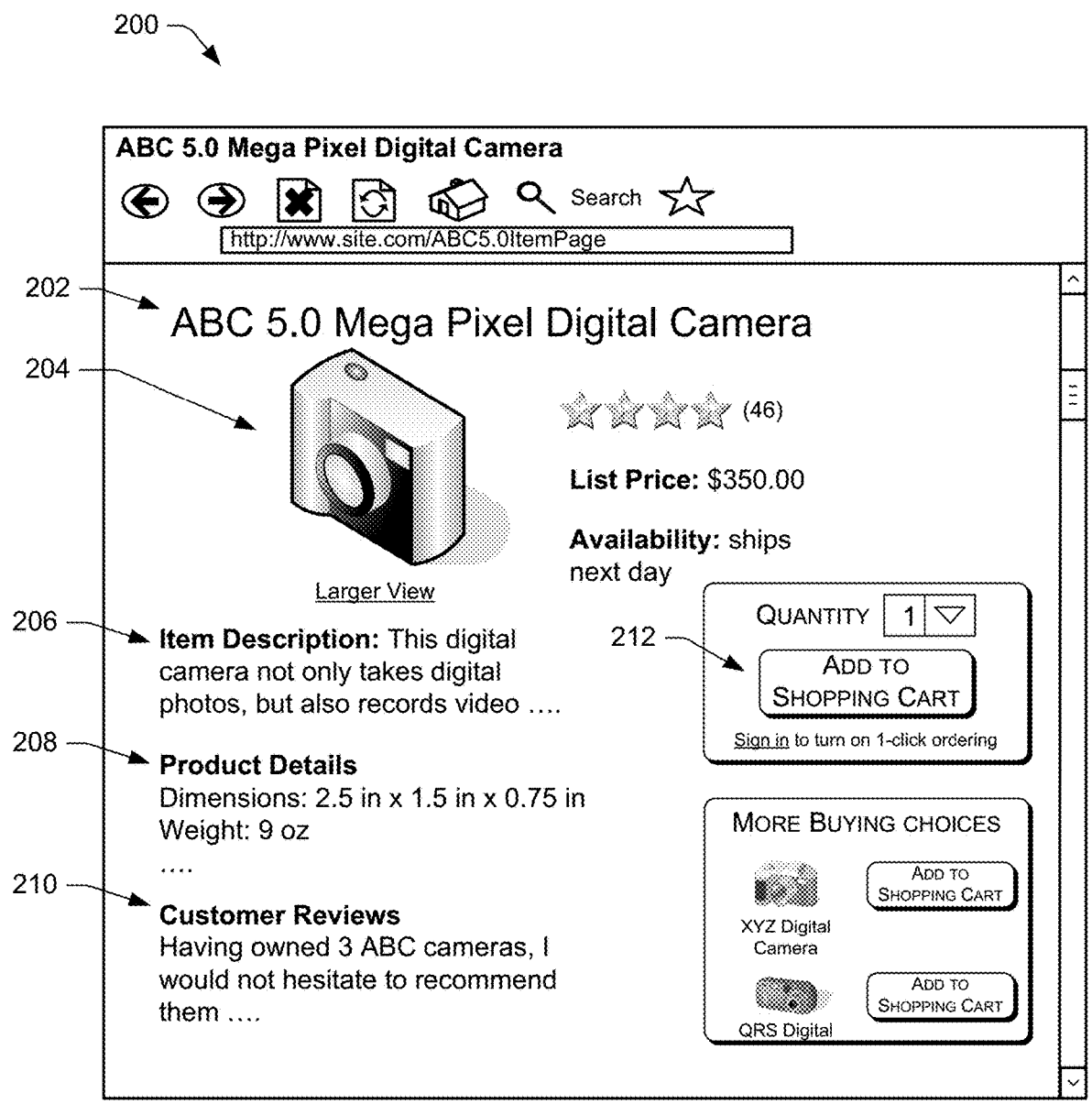
FIG. 2 illustrates an example user interface served by the service provider site of FIG. 1. This example page allows a user to place the illustrated item in a shopping cart for purchase.

FIG. 2 depicts a screen rendering of an illustrative item detail page 200 for a digital camera for sale on site 106. As such, page 200 allows a user of site 106 to consume (here, purchase) an item 140(1) (here, a camera) from item catalog 132. Page 200 includes a title 202, "ABC 5.0 Mega Pixel Digital Camera," and a corresponding illustration 204 of the camera. This page also includes an item description 206, product details 208, and one or more customer reviews 210. Page 200 also includes other information about the ABC digital camera, such as price, availability, and the like. Furthermore, page 200 includes an icon 212 (entitled "Add to Shopping Cart") that, when selected, results in the placement of the illustrated camera in the user's shopping cart for later purchase.

Figure 3:
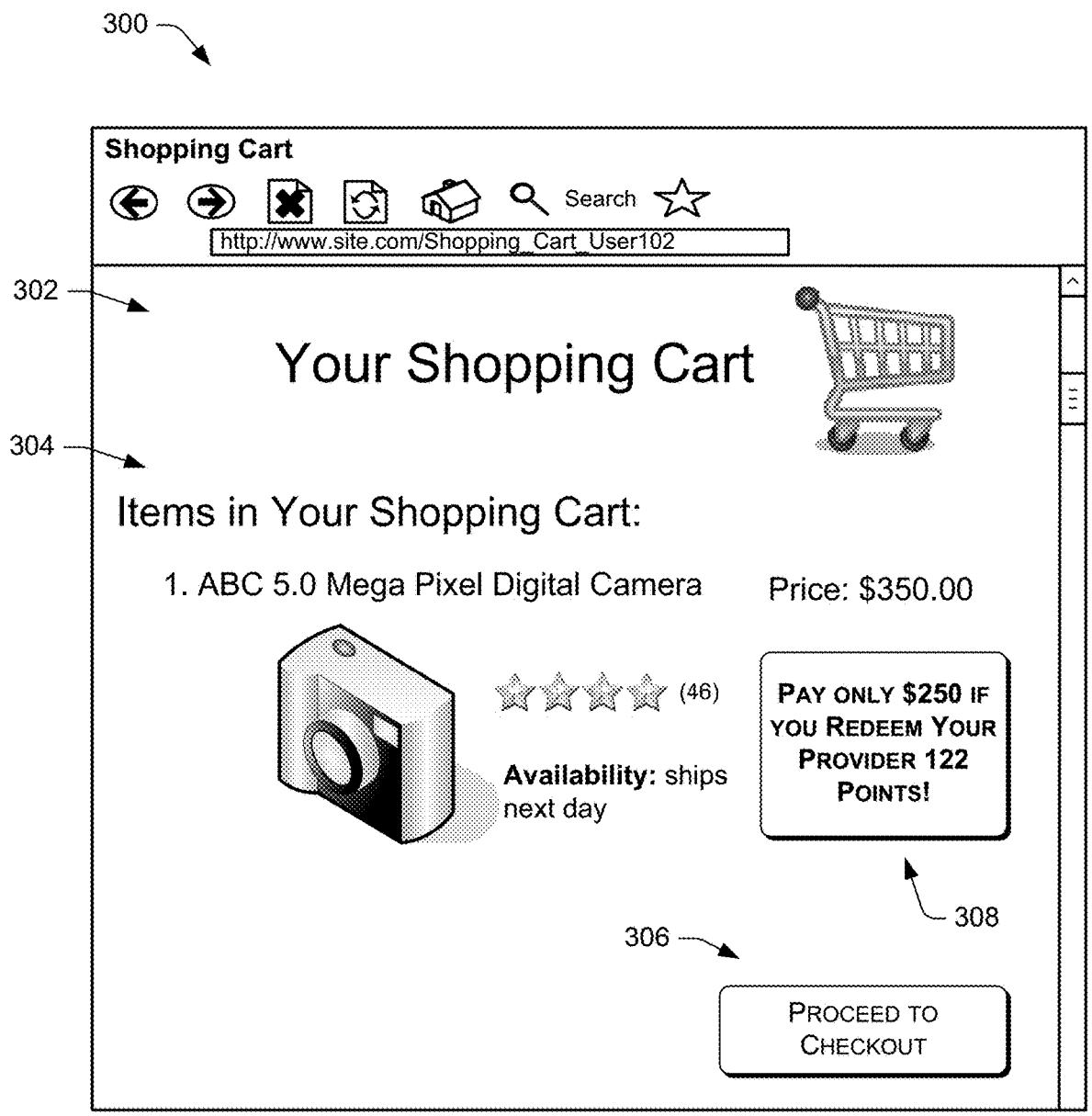
FIG. 3 illustrates an example shopping cart user interface served by the service provider site of FIG. 1. This shopping cart user interface includes a message to the user indicating that the user may apply rewards points, accumulated via the points provider of FIG. 1, to the purchase of the illustrated item.

FIG. 3 illustrates a screen rendering of an illustrative shopping cart page served by site 106 after user 102 has placed the camera from FIG. 2 into his or her shopping cart and after user 102 has selected to view his or her shopping cart. As illustrated, the shopping cart corresponding to user 102 has a single item, in this instance the digital camera. Again, page 300 includes a title ("Your Shopping Cart") 302, and an indication 304 of the items in the cart. Page 300 also includes an icon 306 that, when selected by user 102, causes site 106 to "proceed to checkout."

Finally, this example page 300 includes a message 308. Here, message 308 indicates to user 102 that user 102 could choose to use one or more rewards points that user 102 has accumulated from points provider 122. In this particular and non-limiting example, message 308 informs user 102 that user 102 would only have to pay $250 U.S. dollars for a $350 camera if user 102 were to use the accumulated and available rewards points. While FIG. 3 illustrates a particular message on a particular page, it is specifically noted that site 106 may form and provide similar messages in any number of ways and on any number of pages or on any number of other user interfaces (UIs). In fact, site 106 may further include audio messages, video messages, or messages of any other type of format. Finally, while page 300 includes a message 308 that references rewards points accumulated through a single points provider 122, other embodiments may include messages that reference multiple rewards points balances from, potentially, multiple points providers. Furthermore, it is again noted that while FIG. 3 illustrates page 300, any other types of UIs may similarly employ the techniques described above and below.

FIG. 4 illustrates a screen rendering of an illustrative payments page 400 after user 102 has selected to proceed to checkout via selection of icon 306 from FIG. 3. As illustrated, page 400 allows user 102 to pay for the camera with use of one or more payment instruments. For instance, page 400 includes an area 402 that allows user 102 to pay for the camera with use of rewards points received via provider 122 and/or with use of rewards points received from another points provider ("Provider ABC"). While the current example illustrates two points providers, it is to be appreciated that user 102 may select from any number of points providers in other embodiments. It is also to be appreciated that, in other embodiments, user 102 may be limited to selecting rewards points from a single points provider. In still other embodiments, user 102 may be able to select from multiple points provider, but may be limited to using only one type of rewards points for each item purchase.

Here, page 400 includes a mechanism 404 that allows user 102 to select whether or not to apply accumulated rewards points towards the purchase of the camera as well as which of the rewards points to use. Mechanism 404 also allows user 102 to specify a number of rewards points that he or she wishes to apply to the purchase. Here, page 400 indicates that user has chosen to apply all available 10,000 rewards points from his or her account with points provider 122. While the current example shows that user 102 has chosen to apply all 10,000 points, the user may choose to apply less than all of the points in some instances. Next, page 400 indicates that user 102 has chosen not to use (or site 106 has not allowed user 102 to use) points from his or her account with points provider ABC.

Payments page 400 also includes, in this instance, one or more other areas that allow user 102 to apply one or more other payment instruments to the purchase of the item(s). For instance, the illustrated example includes an area 406 that allows user 102 to pay any remaining balance for the purchase with a credit card. Page 400 also includes a mechanism for user 102 to specify which credit card to use as well as, possibly, accompanying information about the card.

Here, user 102 is presented with an option to use his or her credit card from provider 122, his or her credit card from provider ABC, and/or another credit card. In some instances, these credit cards may correspond to those credit cards for which user 102 has accumulated rewards points available for use on service provider site 106. In some of these instances, if user 102 employs rewards points from a particular account, site 106 may recommend or even require that user 102 place any remaining balance on the associated account at the points provider.

For instance, user 102 has chosen to use his or her points acquired from using his or her "Provider 122 Visa®" in the current example. As such, site 106 may recommend or require that user 102 use his or her Provider 122 Visa® to pay for any overspend (i.e., balance not covered by the redeemed rewards points). In instances where site 106 allows user 102 to use multiple types of rewards points for a same purchase, site 106 may recommend or even require that user 102 use each of the user accounts (e.g., credit cards) at each of the corresponding points providers for any remaining balance (e.g., in equal proportions, in user-specified proportions, etc.).

Figure 5:
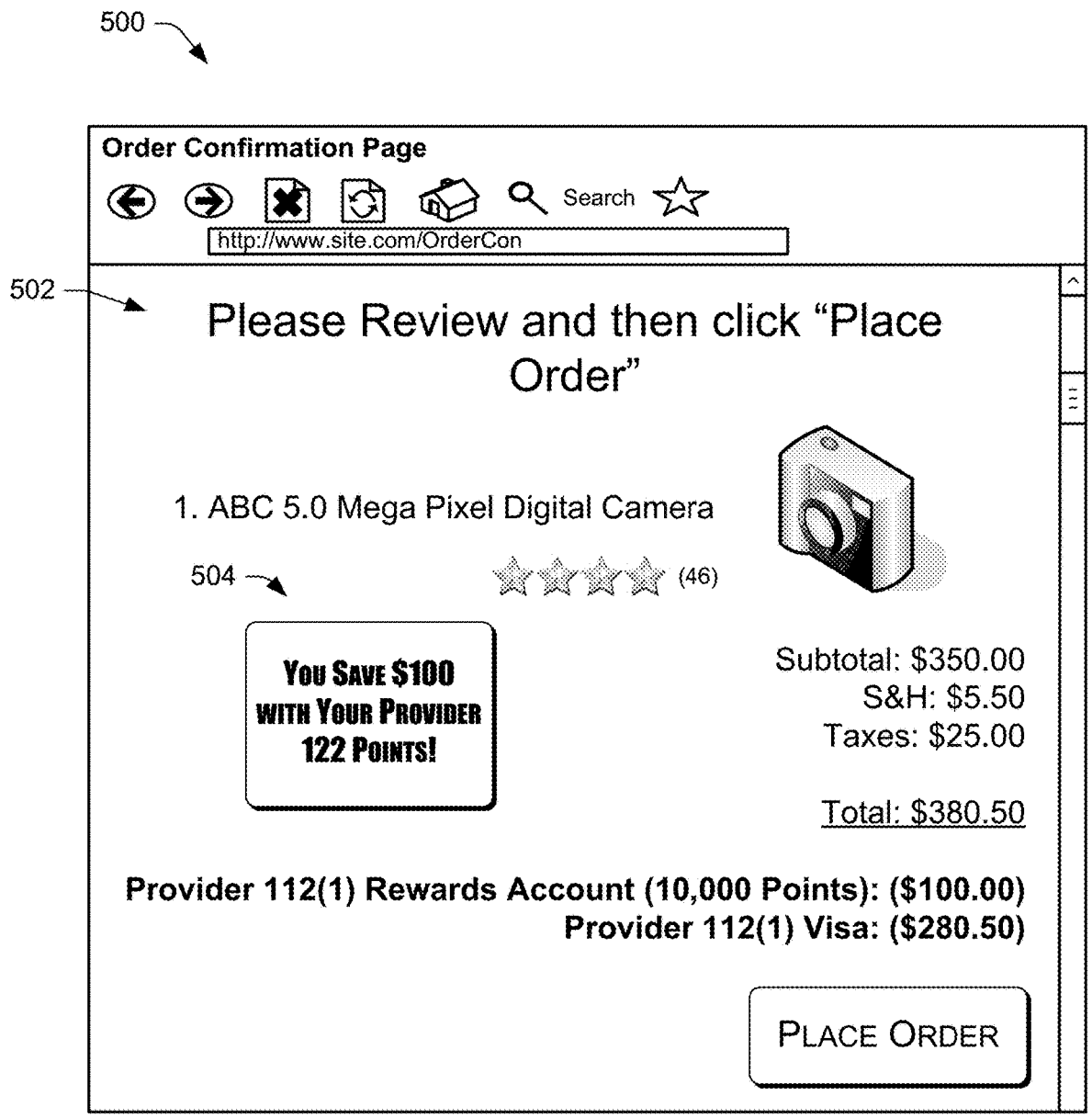
FIG. 5 illustrates an example order confirmation user interface served by the service provider site of FIG. 1. This user interface provides a message to the user indicating that the user saves on the purchase of the item of FIG. 3 by applying accumulated rewards points.

FIG. 5 illustrates an illustrative order confirmation page 500 served by service provider site 106 after user 102 has chosen to pay for the illustrated camera with rewards points from points provider 122, as well as a corresponding credit card. Page 500 includes a title 502 as well as a message 504 to the user indicating that the user saves $100 U.S. dollars on the purchase of the item of FIG. 3 by applying the accumulated rewards points. In addition to encouraging user 102 to complete the purchase, message 504 also serves as an opportunity to advertise for points provider 122. Finally, page 500 illustrates that user 102 has chosen to use both rewards points and a corresponding credit card from provider 122 to pay for the illustrated camera.

Illustrative Flow Diagrams

Figure 7:
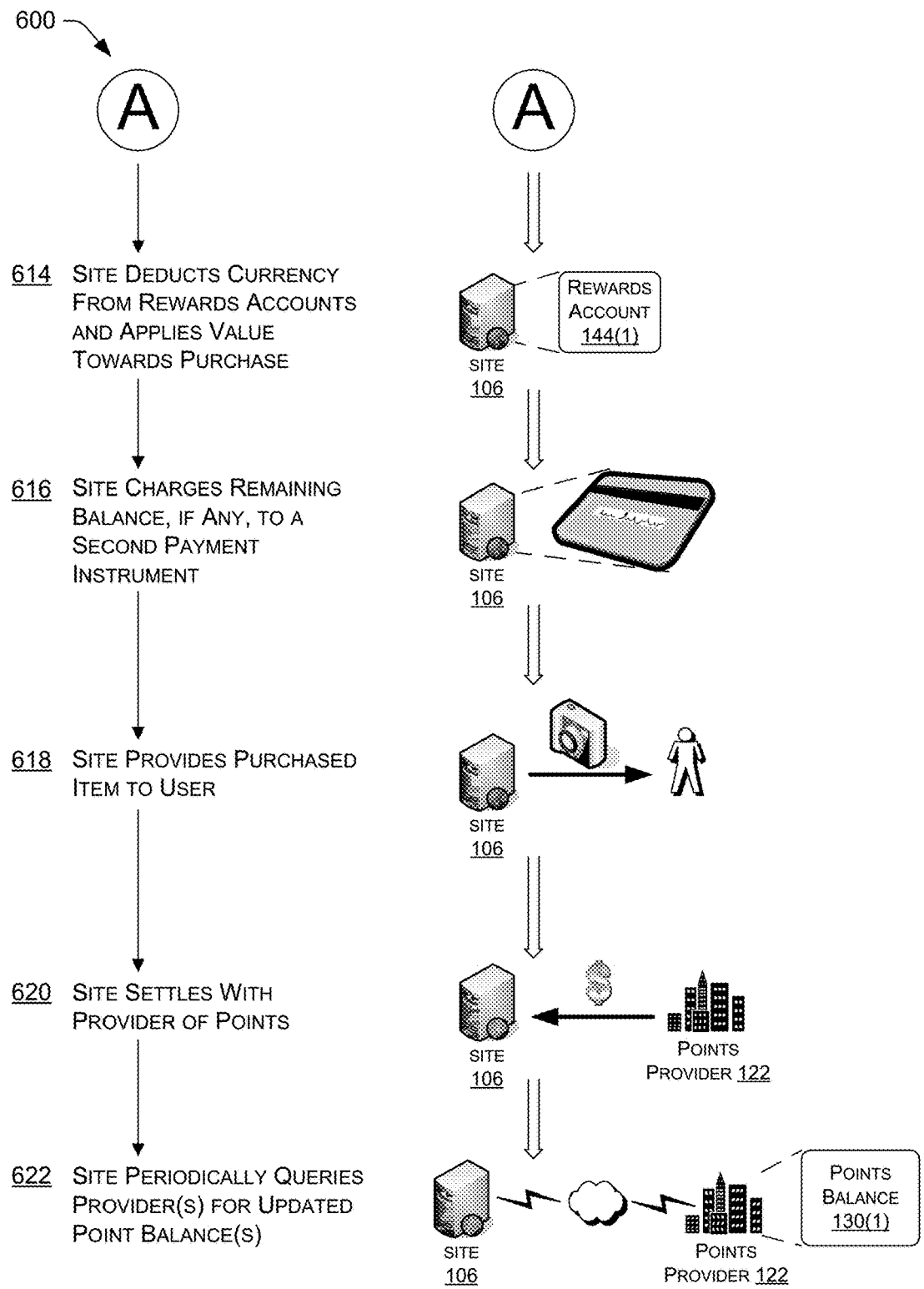

FIGS. 6-7 illustrate a flow diagram of a process 600 of user 102 redeeming rewards points at service provider site 106, which is independent from points provider 122 at which the user accumulated the rewards points. This flow diagram is represented as a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 600 includes operation 602, at which point service provider site 106 periodically queries one or more system-of-record points providers for updated rewards points balances. For instance, site 106 may query points provider 122, which may dispense rewards points to users in exchange for the users using a credit card of the provider. At 604, user 102 logs in to an account of the user at the service provider site. By logging in (or otherwise becoming authenticated to site 106), site 106 recognizes user 102.

Next, at operation 606, site 106 associates the user account at the site with a user account of user 102 at points provider 122. Furthermore, if user 102 is associated with one or more other accounts at the same or different points providers, site 106 may also associate these accounts with the account at the site.

Site 106 may associate the user account at the site with the points-provider account(s) in a number of ways. For instance, site 106 may determine which payment instruments user 102 has previously used on site 106. Site 106 may then determine that the user accounts associated with these payment instruments are associated with the user account of user 102 at site 106. Furthermore, site 106 may allow user to associate a new account with the user's account on the site. For instance, site 106 may serve user 102 a page that includes an icon to "add a new account." Here, user 102 may explicitly provide proof of a user account at a points provider to site 106. For instance, user 102 could provide a credit card number (and/or additional information) in order to associate this credit-card user account with the user's account on site 106.

In still other instances, site 106 may provide an offer to sign up for a new account with a particular points provider. For instance, site 106 may offer user 102 the opportunity to sign up for a credit card associated with a particular financial institution (possibly in exchange for some initial rewards points). In response to the user signing up for the credit card or other type of account, site 106 may associate this account with the user account at site 106.

In some instances, the association between the user account at site 106 and the user account at points provider 122 may be a lasting association or link. That is, once these accounts have been associated (e.g., by user 102 using a particular payment instrument at site 106, by signing up for a new credit card at site 106, etc.), these accounts may remain associated for an extended period of time. For instance, these accounts may remain associated on a semi-permanent or permanent basis, such as until the user account at points provider 122 expires or is otherwise terminated. In addition to remaining for an extended period of time, this association between user accounts may continue without requiring user action, in some instances. As such, site 106 may continue to periodically determine a rewards points balance associated with the user account at points provider 122, without regard to whether or not user 102 is currently authenticated (and/or has recently authenticated) at site 106.

At 608, site 106 provides a message regarding rewards point to user 102. For instance, site 106 may inform user 102 that user 102 has accumulated rewards points that are available for use on site 106.

At 610, user 102 chooses to redeem one or more rewards points by consuming (e.g., purchasing, renting, leasing) an item offered on site 106. In response, site 106 converts the rewards points into currency (e.g., U.S. dollars) and places this currency value into a corresponding rewards accounts at 612. For instance, site 106 may place this currency into a "Points Provider 122 Rewards Account." In instances where points provider 122 is a financial institution that issues a credit card to user 102 (with which the points are accumulated), this rewards account may also be associated with the credit card. While the illustrated embodiment converts the rewards points into currency for storing in a corresponding rewards account at the service provider, raw points may be applied to the purchase in other embodiments. That is, service provider 108 does not convert the rewards points but instead directly applies a number of rewards points to the purchase.

In embodiments where site 106 converts the rewards points into a currency value and stores this value in a corresponding rewards account at site 106, these points may be considered fully and finally redeemed, even if user 102 were to refund the purchased item. That is, envision that site 106 converts rewards points into currency in response to user 102 requesting to purchase an item. If the user were to return the item to service provider 108, the currency would be placed back into the corresponding rewards account for later use by user 102. In instances where site 106 applies raw points to the purchase, however, the points may actually be reapplied to rewards points balance 146(1) (at site 106) and/or rewards points balance 130(1) (at points provider 122) in response to user 102 returning the item.

In embodiments where rewards points are converted into currency, one or both of service provider 108 and points provider 122 may determine the conversion value of the points to the currency. For example, in some instances points provider 122 may inform service provider 108 of the currency value of each rewards point. In other instances, service provider 108 may determine the value of the points, or these entities may jointly determine these values. Furthermore, the currency value of the points may remain fixed, or may vary based on different factors. For instance, one or both of service provider 108 and points provider 122 may vary the value of the points based on a time of redemption (e.g., a day of the week, a season of the year, etc.), a time at which the points were accumulated, a category of item being purchased or otherwise consumed, or for any other reason.

Process 600 continues at FIG. 7 with operation 614. Here, site 106 deducts the currency value from the rewards account and applies the currency towards the requested purchase of the item. At 616, site 106 charges any remaining balance to one or more other payment instruments. In some instances, site 106 automatically charges the remaining balance to the credit card, line of credit, or other payment instrument that is associated with the redeemed rewards points. For instance, if the redeemed rewards points were accumulated with use of a particular credit card, then site 106 may charge the a portion or all of the remaining balance to the credit card. At 618, service provider 108 provides (via site 106 or otherwise) the purchased item to user 102.

At 620, service provider 108 settles (via site 106 or otherwise) with points provider 122. That is, site 106 may invoice points provider 122 for the amount of the converted currency that was based on the redeemed rewards points and applied to the purchase of the item. In some instances, service provider 108 settles with provider 122 on a per-purchase basis, while in other instances service provider 108 settles with provider 122 on a periodic basis (e.g., nightly, weekly, monthly, etc.). In addition to providing payment to service provider 108, points provider may also decrease a corresponding rewards points balance of the user. For instance, points provider 122 may reduce rewards points balance 130(1) by the amount of points redeemed by user 102. Service provider site 106 may similarly reduce rewards points balance 146(1). In some instances, user 102 redeems rewards points at service provider 108 (e.g., via site 106) without authenticating or interacting with the user account of user 102 at points provider 122.

Finally, operation 622 represents that the process may repeat, as operation 622 represents site periodically querying one or more points providers for updated rewards points balances.

Additional Operation

Figure 8:
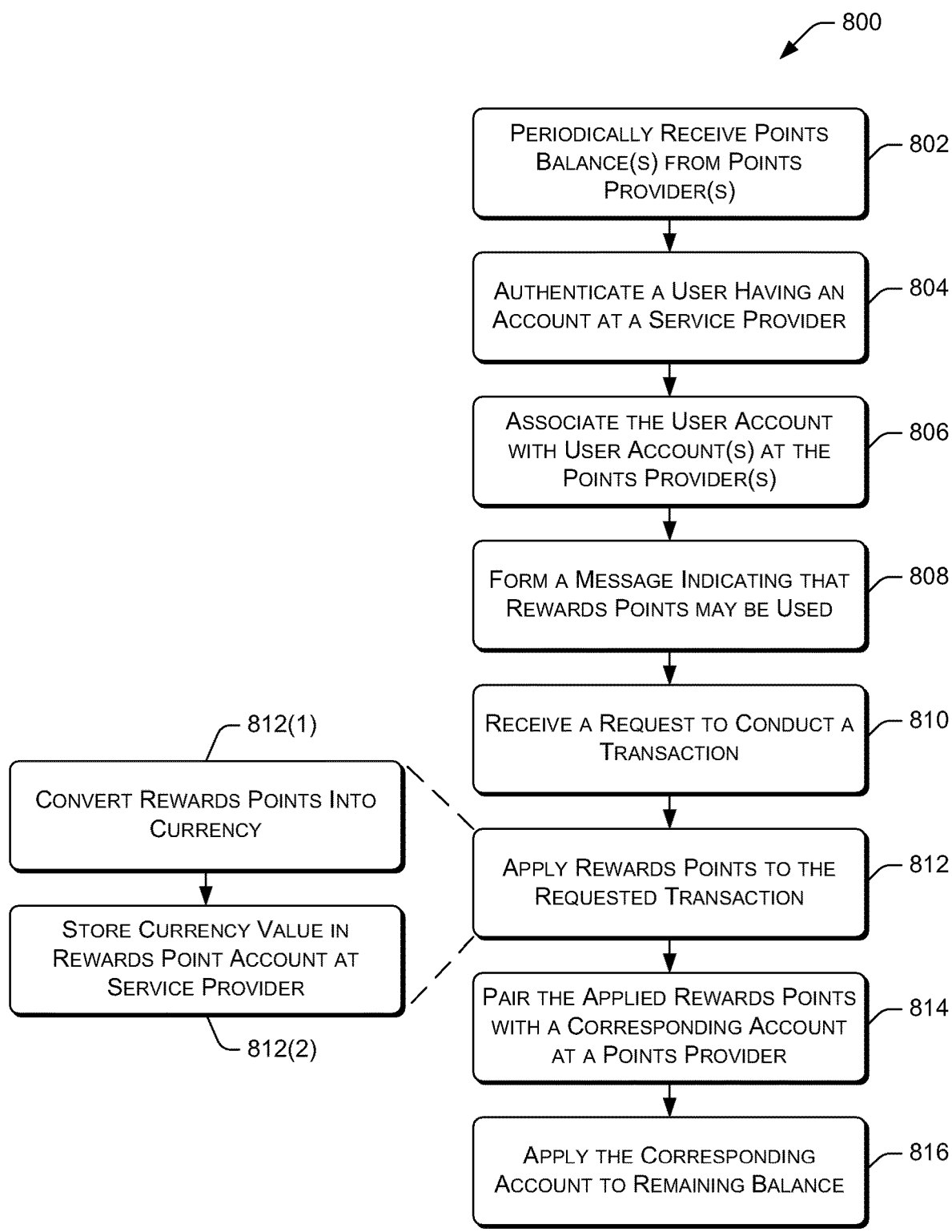
FIG. 8 is a example process for employing the techniques described herein.

FIG. 8 illustrates an example process 800 for redeeming rewards points as discussed above. This process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

While process 800 may be implemented in architecture 100 of FIG. 1, the process may be implemented in a varying array of other architectures, environments and contexts.

Process 800 includes operation 802, which represents a service provider periodically receiving one or more rewards points balances from one or more points providers for one or more users. Next, operation 804 represents authenticating a user having an account at the service provider. For instance, the user may log into a site associated with the service provider via a computing device, a phone, or otherwise. At operation 806, the service provider associates the user account at the service provider with one or more corresponding user accounts at one or more points providers. In some instances, this association is a lasting association, whereby user 102 need not continually associate these accounts with one another. Instead, service provider 108 (e.g., via site 106) and/or points provider 122 may maintain this association for an extended period of time (e.g., permanently, until a user account expires or is terminated, etc.).

Operation 808, meanwhile, represents forming a message for consumption by the user, the message indicating that rewards points may be used to consume an item offered by the service provider. The formed message may be a visual message, as illustrated in the preceding figures, or the message may be audible or may take any other suitable format. Next, operation 810 represents receiving a request to conduct a transaction. For instance, a request to purchase, download, lease, rent, view, or otherwise consume an item may be received from the authenticated user. In response, the service provider may apply rewards points to the requested transaction at 812.

As illustrated, operation 812 may comprise a series of sub-operations. Sub-operation 812(1) converts rewards points into a currency value, such as U.S. dollars, Euros, or the like. Sub-operation 812(2) then stores the currency value in a rewards point account at the service provider.

At operation 814, the service provider pairs the redeemed rewards points with a corresponding account at the points provider. For instance, the service provider may pair rewards points accumulated with a credit card with the underlying credit card. Finally, the service provider may apply the corresponding account to satisfy some or all of any remaining balance from the purchase of the item at operation 816. In example discussed immediately above, the service provider may apply the underlying credit card to satisfy the remaining balance.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
   a first server system that operates in a first network domain, the first server system (1) storing, in a first database, item information associated with a plurality of items available for consumption via a merchant website associated with the first server system, (2) storing, in a second database, first account information including a plurality of first user accounts and first rewards points balances respectively associated with the first user accounts, (3) hosting a points-to-currency converter configured with computer executable instructions to convert the first rewards points balances to currency values and to store the currency values in the second database in association with corresponding first user accounts, (4) hosting an authentication service configured with computer executable instructions to authenticate a user so that the user can perform transactions using at least one of the first user accounts that is associated with the user, and (5) hosting the merchant website, the merchant web site including individual pages corresponding to individual ones of the plurality of items available for consumption via the merchant website, wherein at least one of the individual pages includes an item title, an item image, an item description, item details, customer reviews associated with the item, an item rating, an item price, an indication of an amount the user needs to pay to consume the item when at least one of the first rewards points balances are used to consume the item, and a selectable interface icon that is configured to enable the user to consume the item, the first server system enabling users to consume items by authenticating, at the first server system, and redeeming, at the first server system, available rewards points associated with a rewards points provider without authenticating and interacting directly with a corresponding second user account at the rewards points provider;
   a second server system that operates in a second network domain that is distinct from the first network domain, the second server system being associated with the rewards points provider and storing, in a third database, second account information including a plurality of second user accounts and second rewards points balances respectively associated with the plurality of second user accounts, the second rewards points balances accumulating rewards points in response to the plurality of second user accounts utilizing credit cards associated with the rewards points provider,
   wherein the first server system is configured with computer executable instructions to:
   associate a particular first user account of the first user accounts at the first server system with a particular second user account of the second user accounts at the second server system by:
      authenticating a user having the particular first user account at the first server system;
      receiving, from a first user interface generated at least in part by the first server system, an indication of the particular second user account, the particular second user account at the second server system being associated with a particular second rewards points balance of the second rewards points balances;
      querying the third database at the second server system to identify the particular second user account at the second server system in the third database;
      associating the particular first user account at the first server system with the particular second user account at the second server system until affirmatively terminated;
   periodically determine, regardless of whether the user is currently accessing the merchant web site, a currency value corresponding to the particular first user account at the first server system by:
      querying, over one or more networks, the second server system for data indicative of the particular second rewards points balance, the particular second rewards points balance indicating a number of rewards points available for redemption;

storing, in the second database, the particular second rewards points balance as a particular first rewards point balance of the first rewards points balances that is associated with the particular first user account;

converting, by the points-to-currency converter, the particular first rewards points balance to the currency value according to a conversion value; and storing, in the second database, the currency value associated with the particular first user account;

provide, to a user device associated with the particular first user account, access to the merchant website by:

receiving, from the user device, a first request corresponding to a particular item of the items;

in response to receiving the first request, causing the user device to display at least one of the individual pages including a title of the particular item, an image of the particular item, a description of the particular item, details of the particular item, customer reviews associated with the particular item, a rating of the particular item, a price of the particular item, an indication of an amount of currency a user needs to pay to consume the particular item when the particular first rewards points balance is used to consume the particular item, and a selectable interface icon that is configured to enable the user to consume the particular item, the amount of currency corresponding to the currency value corresponding to the particular first rewards points balance subtracted from the price of the particular item;

receiving, from the user device, a second request from a second user interface to acquire the item with use of the particular first rewards points balance, wherein the item is also available from the first server system in exchange for a direct payment wholly in currency; and responsive to receiving the second request, applying the currency value corresponding to the particular first rewards points balance to pay for a first part of the price of the item;

settle a transaction for the item by:

sending a payment request to the second server system, the payment request directing the second server system to charge a second part of the price of the item on a particular line credit card associated with the particular second user account at the second server system; and transmitting, to the second server system, a request to debit the particular second rewards points balance with the particular first rewards points balance; and receiving, from the second server system, a payment corresponding to the currency value.

2. A computer-implemented method performed by a first server system, the method comprising:

associating a first user account at the first server system with a second user account at a second server system, wherein the first server system is separate from the second server system;

periodically determining a currency value associated with the first user account by periodically:

determining a rewards points balance associated with the second user account at the second server system;

converting the rewards points balance into the currency value, wherein the currency value is available for redemption at the first server system for a tangible product that is also available to be purchased from a service provider directly with currency; and storing, in a database at the first server system, the currency value converted from the rewards points balance;

after the currency value is stored in the database, receiving a request to place an order for the tangible product;

in response to receiving the request, presenting a payments page including a first option to pay for the tangible product with the currency value converted from the rewards points balance and a second option to pay for the tangible product with a different payment instrument;

receiving an indication to apply a portion of the currency value converted from the rewards points balance toward purchase of the tangible product;

determining that a remaining balance for the tangible product exists after application of the portion of the currency value;

indicating, on the payments page, that the remaining balance exists; and settling a transaction for the tangible product by transmitting, to the second server system, a payment request for the remaining balance from the second user account at the second server system and transmitting, to the second server system, an indication of an amount of rewards points to be debited from the rewards points balance, the amount of rewards points to be debited corresponding to the portion of the currency value applied to the purchase of the tangible product.

3. The computer-implemented method as recited in claim 2, wherein the second user account at the second server system comprises a line of credit at a financial institution.

4. The computer-implemented method as recited in claim 2, wherein the first user account and the second user account are associated with a same user, and wherein the second user account accumulates the rewards points balance based at least in part on use of a financial institution.

5. The computer-implemented method as recited in claim 2, wherein a credit card is associated with the second user account, and wherein accumulation of the rewards points balance is based at least in part on use of the credit card.

6. A computer-implemented method performed by a first server system, the method comprising:

associating a first user account at the first server system with a second user account at a second server system;

determining a rewards points balance associated with the second user account at the second server system;

converting the rewards points balance to a currency value;

associating the currency value with the first user account;

presenting, on a user device corresponding to the first user account via a merchant website, a first page including a title of an item, an image of the item, a rating of the item, a price of the item, a remaining balance indicating an amount of currency remaining when the currency value is subtracted from the price of the item, and a selectable interface icon that is configured to enable the user to consume the item;

receiving a request to consume the item that includes a request to apply a portion of the currency value to the price of the item; and settling a transaction for the item by transmitting, to the second server system, a request for the portion of the currency value.

7. The computer-implemented method as recited in claim 6, wherein the rewards points balance is accumulated by the second user account at least in part through participation in an activity designated by a points provider.

8. The computer-implemented method as recited in claim 6, wherein the request to consume the item comprises a request to purchase, rent, or lease the item.

9. The computer-implemented method as recited in claim 6, further comprising receiving, at the first server system, currency equal in value to the rewards points balance.

10. A first server system, comprising:
one or more processors; and
memory storing computer-executable instructions that, when executed by the one or more processors, cause the system to perform operations comprising:
associating a first user account at the first server system with a second user account at a second server system, wherein the first server system is separate from the second server system;
periodically determining a currency value associated with the first user account by periodically:
determining a rewards points balance associated with the second user account at the second server system;
converting the rewards points balance into the currency value, wherein the currency value is available for redemption at the first server system for a tangible product that is also available to be purchased from a service provider directly with currency; and
storing, in a database at the first server system, the currency value converted from the rewards points balance;
after the currency value is stored in the database, receiving a request to place an order for the tangible product;
in response to receiving the request, presenting a payments page including a first option to pay for the tangible product with the currency value converted from the rewards points balance and a second option to pay for the tangible product with a different payment instrument;
receiving an indication to apply a portion of the currency value converted from the rewards points balance toward purchase of the tangible product;
determining that a remaining balance for the tangible product exists after application of the portion of the currency value;
indicating, on the payments page, that the remaining balance exists; and
settling a transaction for the tangible product by transmitting, to the second server system, a payment request for the remaining balance from the second user account at the second server system and transmitting, to the second server system, an indication of an amount of rewards points to be debited from the rewards points balance, the amount of rewards points to be debited corresponding to the portion of the currency value applied to the purchase of the tangible product.

11. The first server system of claim 10, wherein the rewards points balance comprises rewards points accumulated based on use of a payment instrument, the payment instrument being at least one of a credit card, a debit card, or a line of credit.

12. The first server system of claim 10, wherein the rewards points balance comprises rewards points that are accumulated based at least in part on participation in an activity designated by a points provider.

13. A first server system, comprising:
one or more processors; and
memory storing computer-executable instructions that, when executed by the one or more processors, cause the system to perform operations comprising:
associating a first user account at the first server system with a second user account at a second server system;
determining a rewards points balance associated with the second user account at the second server system;
converting the rewards points balance to a currency value;
associating the currency value with the first user account;
presenting, on a user device corresponding to the first user account via a merchant web site, a first page including a title of an item, an image of the item, a rating of the item, a price of the item, a remaining balance indicating an amount of currency remaining when the currency value is subtracted from the price of the item, and a selectable interface icon that is configured to enable the user to consume the item;
receiving a request to consume the item that includes a request to apply a portion of the currency value to the price of the item; and
settling a transaction for the item by transmitting, to the second server system, a request for the portion of the currency value.

14. The first server system as recited in claim 13, wherein the rewards points balance comprises rewards points that are accumulated through use of a credit card.

15. The computer-implemented method as recited in claim 6, wherein the first server system is operated by a service provider that does not sell rewards points.

16. The system as recited in claim 1, wherein the particular second user account is a financial user account associated with a credit card, and
wherein the particular second rewards points balance comprises rewards points that are accumulated based at least in part on use of the credit card.

17. The computer-implemented method as recited in claim 2, wherein receiving a request to place an order for the tangible product comprises placing an indication of the tangible product in a shopping cart for later purchase.

18. The first server system as recited in claim 11, wherein the payments page indicates that payment with the rewards points requires the remaining balance to be paid from the payment instrument.

19. The computer-implemented method as recited in claim 6, wherein the request for the portion of the currency value from the second user account at the second server system comprises a payment request for the remaining balance from a financial user account at a financial institution, the financial user account being associated with a credit card, and
wherein the rewards points balance comprises rewards points that are accumulated based at least in part on use of the credit card.

20. The computer-implemented method as recited in claim 6, further comprising causing the user device to display, on the first page, a requirement to pay the remaining balance from a financial institution that provided rewards points in the rewards points balance.

21. The first server system as recited in claim 10, wherein the payment request for the remaining balance is a request for payment of the remaining balance from a payment instrument, the payment instrument comprising a credit card, and wherein the rewards points balance comprises rewards points that are accumulated based at least in part on use of the credit card.

22. The first server system as recited in claim 10, wherein the operations further comprise causing a device to display an order confirmation page that includes an image of a tangible item and an indication of savings due to use of the rewards points balance.

23. The system of claim 1, the currency value being a first currency value, the conversion value being a first conversion value, wherein the first server system is configured with computer executable instructions to further:

associate the particular first user account with a third user account at a third server system; and periodically determine, regardless of whether the user is currently accessing the merchant web site, a second currency value corresponding to first user account:

querying, over one or more networks, the third server system for data indicative of a third rewards points balance, the third rewards points balance indicating a number of rewards points available for redemption;

storing, in the second database, the third rewards points balance as another one of the first rewards points balances that is associated with the particular first user account;

converting, by the points-to-currency converter, the third rewards points balance to the second currency value according to a second conversion value; and storing, in the second database, the second currency value associated with the particular first user account.

24. The system of claim 23, the amount of currency being a first amount of currency, wherein the at least one of the individual pages further includes an indication of a second amount of currency a user needs to pay to consume the particular item when the third rewards points balance is used to consume the particular item, the second amount of currency corresponding to the second currency value subtracted from the price of the particular item.

* * * * *